(12) United States Patent
Seiple et al.

(10) Patent No.: US 7,735,897 B2
(45) Date of Patent: Jun. 15, 2010

(54) VEHICLE SLIDER ASSEMBLY

(75) Inventors: Shane C. Seiple, Perrysburg, OH (US); Charles E. Ash, Perrysburg, OH (US); H. Richard Voght, Perrysburg, OH (US)

(73) Assignee: Pilkington North America, Inc., Toledo, OH (US)

( * ) Notice: Subject to any disclaimer, the term of this patent is extended or adjusted under 35 U.S.C. 154(b) by 248 days.

(21) Appl. No.: 12/072,244

(22) Filed: Feb. 25, 2008

(65) Prior Publication Data
US 2009/0212591 A1   Aug. 27, 2009

(51) Int. Cl.
*B60J 1/00* (2006.01)
(52) U.S. Cl. ............... 296/84.1; 296/89; 296/146.1; 296/201
(58) Field of Classification Search ........... 296/84.1, 296/146.1, 201, 85, 89; 49/374, 489.1, 453, 49/413; 52/204.51, 208, 209
See application file for complete search history.

(56) References Cited
U.S. PATENT DOCUMENTS
5,799,449 A   9/1998   Lyons et al.

| | | |
|---|---|---|
| 2007/0157522 A1 | 7/2007 | Hebert et al. |
| 2007/0241569 A1 | 10/2007 | Kitayama et al. |
| 2008/0060275 A1 | 3/2008 | Recker |
| 2008/0263960 A1 | 10/2008 | Murphy |

FOREIGN PATENT DOCUMENTS
WO   WO 96/33332 A   10/1996

*Primary Examiner*—Lori L Lyjak
(74) *Attorney, Agent, or Firm*—Marshall & Melhorn, LLC

(57) ABSTRACT

A vehicle slider assembly has a frame, upon which a fixed panel and an upper and a lower track are attached, and a slider panel assembly that moves in the tracks. The frame defines a window opening that the moving slider panel assembly opens and closes. The interior surfaces of the frame provide constant sealing surfaces for seals attached to the outwardly directed slider panel surfaces. The lower horizontal portion of the frame is adjacent to the lower track and has drain holes through it. The lower track has a reservoir channel defined in it, such that, moisture that is interior to the vehicle slider assembly accumulates in the reservoir channel and flows through the drain holes to the exterior of the vehicle slider assembly. An appliqué may be disposed over the exterior of the lower frame portion so that the flow of the moisture is hidden in an unencumbered and aesthetically pleasing manner.

16 Claims, 5 Drawing Sheets

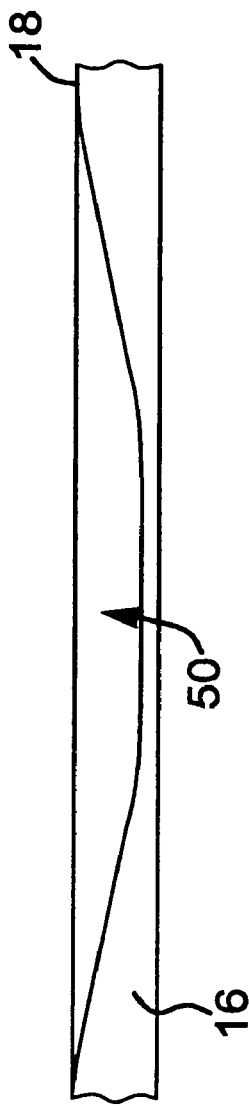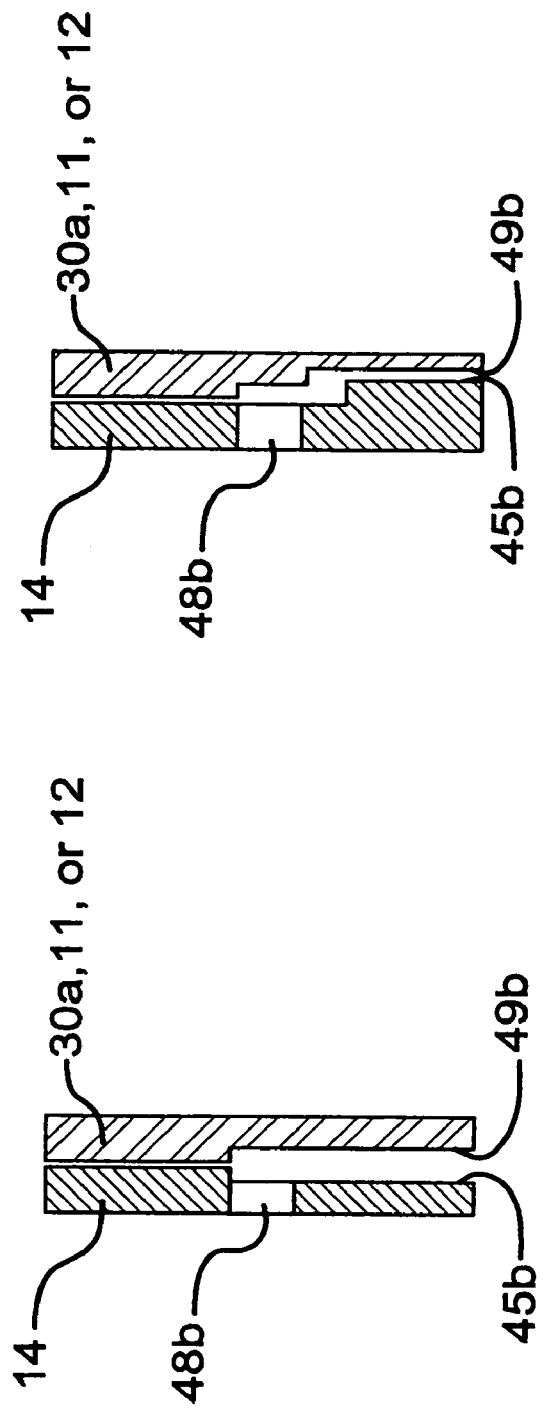

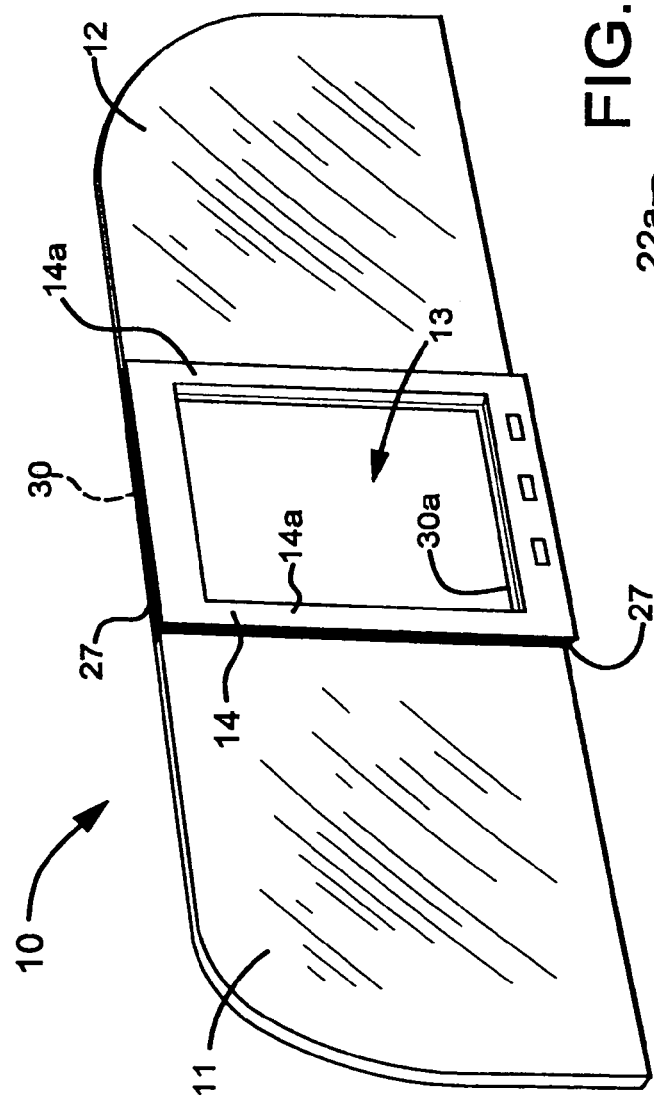
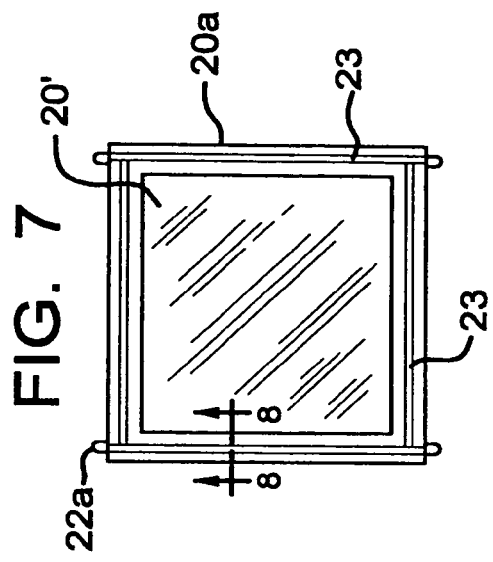
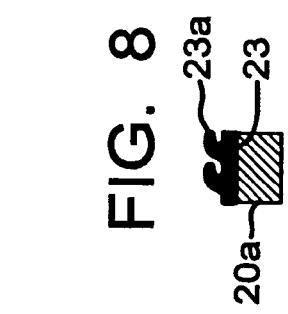

VEHICLE SLIDER ASSEMBLY

FIELD OF THE INVENTION

The present invention relates to a vehicle window assembly and, in particular, to a vehicle slider with a moisture removal system.

BACKGROUND OF THE INVENTION

It is known that pickup trucks and other related vehicles have a rear window, or backlite, that is mounted in the vehicle body opening, often immediately behind seats in the vehicle passenger compartment. Typically, such backlites are supplied to vehicle manufacturers as a one piece or as a stand-alone frame assembly for installation in new vehicles being manufactured on an assembly line.

In some of these vehicles, the backlite is provided with a sliding panel mechanism and a seal system (commonly known as a slider), which opens and closes over an opening in the backlite, so as to allow, for example, outside air to enter the vehicle compartment and to allow for passing of objects through the backlite opening. Sliders, in which a sliding panel moves in either a horizontal direction or a vertical direction, typically comprise at least one sliding panel that utilizes, for example, frame channels, rails, or tracks to facilitate sliding motion. In addition, a frame, with an attached seal(s), acts to seal out moisture and noise from entering the vehicle compartment at the periphery of the backlite.

It is common for the stand-alone backlite assembly to be molded and subsequently mounted into the vehicle body opening in the vehicle body frame, where the backlite assembly is secured to the vehicle body opening with adhesives and/or mechanical fastening devices, for example, studs. A urethane adhesive is frequently used in backlite applications, such adhesive being applied to a mounting surface of the vehicle body opening and/or the backlite assembly, prior to the moment at which these two structures are brought into bonding contact.

In addition to the slider panel, some of the vertical slider assemblies have two fixed panels (hence, they are known as partial sliders), which typically are positioned on either side of the backlite opening. Each fixed panel has a substantially vertically oriented panel edge, on which a vertical track and/or division post are often disposed.

Typically, for the horizontal sliders, the backlite opening is further defined by an upper header member and a lower beltline support member. In addition, for the horizontal sliders, the slider panel is typically moved in a horizontal direction behind one or both of the fixed panels that span the vehicle opening (along horizontal tracks that are commonly disposed on or near the fixed panels) and then, is moved to cover the backlite opening. These movements of the sliding panel may be provided by manual or electromechanical means.

Some slider assemblies are further designated as being flush where the sliding panel is in the plane of the fixed panel(s) when the sliding panel completely closes the backlite opening, or the complete window assembly may be in the plane of a vehicle body panel. Various ways to achieve flush orientation to fixed panels are, for example, by utilizing guide pins, ramps, and cams to move the sliding panel into the backlite opening.

Further, it is common for most slider assemblies to allow moisture to enter a vehicle compartment, but, on the other hand, it is difficult to remove the moisture from within the passenger compartment near the lower interior portion of the slider assembly, below the backlite opening. This accumulated moisture may be the result of evaporation and/or thawing of water/frost/ice on the interior of the window panels, or moisture may enter the vehicle compartment through the backlite opening by seeping between the panels when the sliding panel completely covers the backlite opening or when the slider panel is partially opened over the backlite opening. Thus, it is best to remove such accumulated moisture in order to prevent corrosion or other moisture-related damage in the interior of the passenger compartment.

However, for a variety of reasons, the necessary removal of moisture has not always been handled in a systematic and an aesthetically pleasing manner. Hence, a better means of moisture removal for a vehicle slider is sought that provides reliable, unencumbered drainage of moisture from a vehicle near the lower interior of the slider assembly at the backlite opening, to the exterior of the vehicle. In addition, the drainage of moisture should be accomplished in a systematic and an aesthetically pleasing manner.

SUMMARY OF THE INVENTION

A vehicle slider assembly with a moisture removal system comprises a frame, upon which a fixed panel and an upper track and a lower track are disposed, and a slider panel assembly that moves in the tracks. The frame has vertical and horizontal portions that define a window opening that the moving slider panel assembly opens and closes. A lower horizontal portion of the frame is adjacent to the lower track and has one or more drain holes therethrough. The lower track has a reservoir channel defined in it, such that, moisture that is interior to the vehicle slider assembly accumulates in the reservoir channel and flows through the drain holes to the exterior of the vehicle slider assembly.

A fixed panel or an appliqué may be disposed over the exterior of the lower frame portion so that the flow of the moisture is hidden in an unencumbered and aesthetically pleasing manner.

Further advantages of the present invention will be apparent from the following description and appended claims, reference being made to the accompanying drawings forming a part of a specification, wherein like reference characters designate corresponding parts of several views.

BRIEF DESCRIPTION OF THE DRAWINGS

FIG. 3 is a partial rear elevation view of the lower track in the direction of the line 3-3 of FIG. 1;

FIG. 4a is a cross sectional view of the lower track in the direction of the arrows of the line 4a-4a of FIG. 1;

FIG. 4b is an alternate cross sectional view of the lower track in the direction of the arrows of the line 4b-4b of FIG. 1;

FIG. 6 is three dimensional view of the slider panel assembly of FIG. 2 where a frame is encapsulated to the fixed panels;

FIG. 7 is an elevation view of a slider panel in the direction of the arrows of the line 7-7 of FIG. 2; and FIG. 8 is a cross sectional view in the direction of the line 8-8 of FIG. 7 of the slider panel with articulating portions.

DETAILED DESCRIPTION OF THE INVENTION

Figure 1:
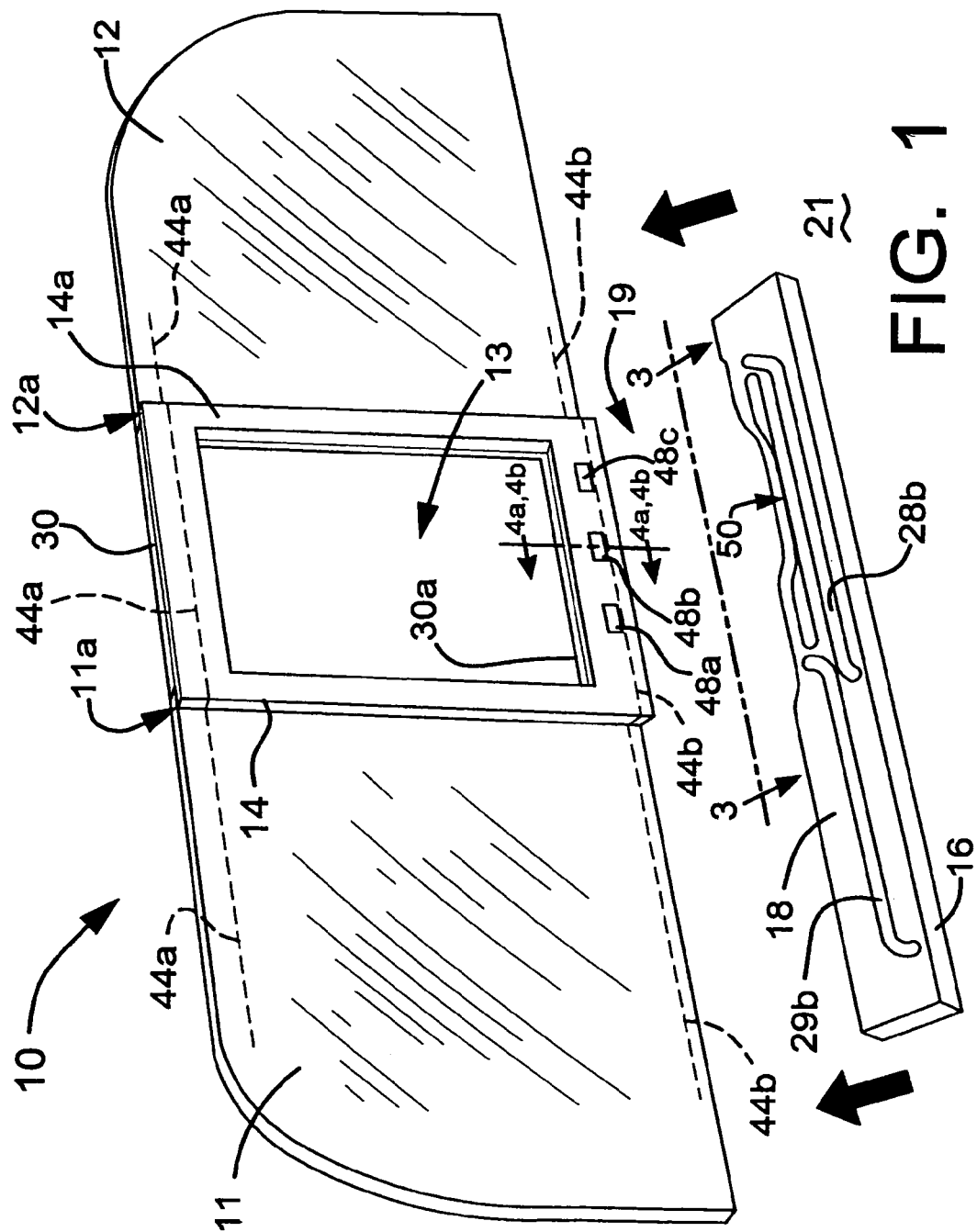
FIG. 1 is a three dimensional view of a horizontal slider assembly in accordance with the present invention.
Figure 2:
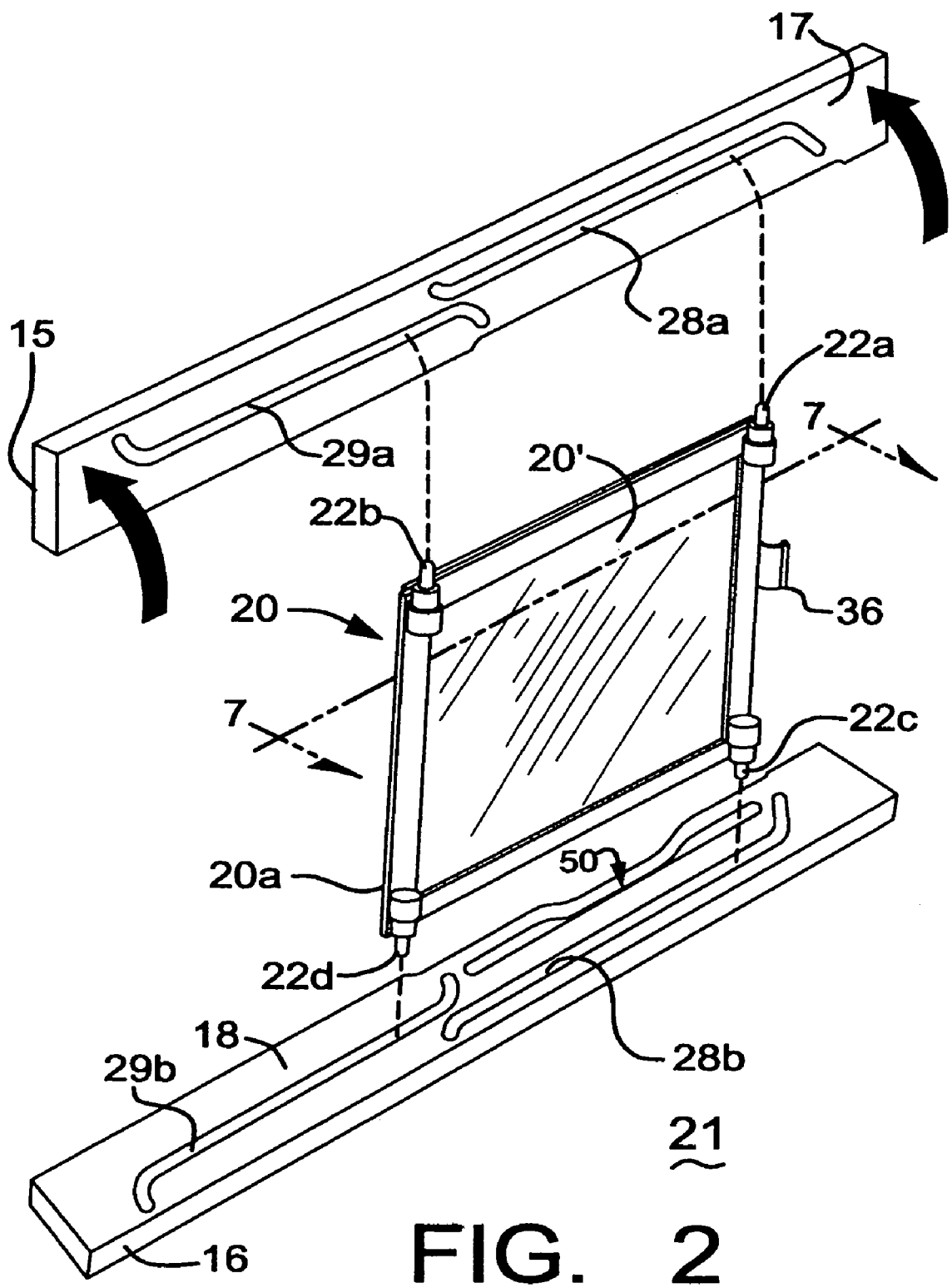
FIG. 2 is a three dimensional view of a lower track and an upper track, with a slider panel assembly therebetween, of the horizontal slider assembly of FIG. 1.
Figure 5:
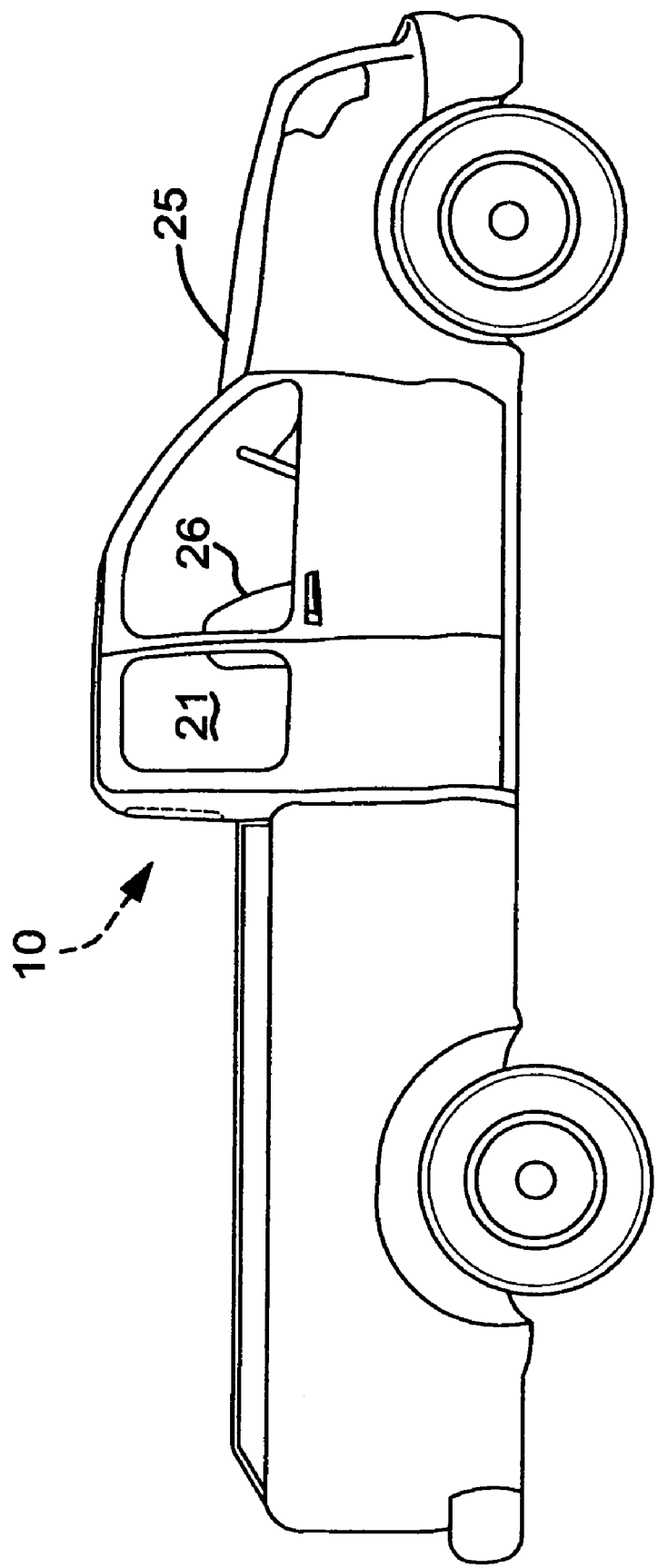
FIG. 5 is a side elevation view of a pick up truck incorporating the horizontal slider assembly of FIG. 1.

Illustrated in FIGS. 1-8 is a vehicle slider assembly 10, also known as a backlite with a slider, with a moisture removal system 19. As shown in FIG. 2, the vehicle slider assembly 10 has at least one slider panel assembly 20 that comprises a slider panel 20a. The slider panel assembly 20, which also has a sliding mechanism that may be common in the art, is utilized to open and close a window opening 13 (i.e., the backlite opening). FIG. 1 is viewed from within a vehicle compartment 21, where, for example, driver and passenger seating 26 (see FIG. 5) may be disposed in a vehicle, for example, a pick up truck 25.

Also shown in FIG. 1 is the horizontal vehicle slider assembly 10 further comprising fixed panels 11,12, which respectively have substantially vertical fixed panel edges 11a,12a, and a frame 14 that defines the window opening 13. The frame 14 may be secured by way of adhesive bonding on each of the fixed panel edges 11a,12a. However, as shown in FIG. 6, the frame 14 may alternately be secured by way of an encapsulating seal 27 to the fixed panels 11, 12. As can be seen in FIG. 1, the frame 14 comprises an upper horizontal frame portion, a lower horizontal frame portion, and two vertical frame portions which typically are integrally formed as a unitary part.

As shown in FIGS. 7-8, in order to seal the window opening 13 off from, for example, exterior moisture, noise, dirt, and debris, a seal 23 is disposed on the outwardly directed surfaces of the slider panel 20a that comprising a panel 20'. The seal 23 can have articulating portions 23a that fold one onto the other as the seal 23 makes continuous sealable contact with an interior frame surface 14a (see FIG. 6) of the frame 14.

It is within the spirit and scope of the instant invention that, depending on the design of the exterior fascia of the vehicle slider assembly 10, a single fixed panel (11 or 12) or any combination of the fixed panels 11,12, upper appliqué 30, or lower appliqué 30a (as partially illustrated in FIGS. 4a-4b), could further define the window opening 13.

The vehicle slider assembly 10 further comprises an upper track 15 and a lower track 16 having, respectively, a lower surface 17 and an upper surface 18. Parallel paths 28a,28b and 29a,29b are formed in their respective tracks 15,16, so as to cooperate with each other by allowing slider pins 22a,22c and slider pins 22b,22d to slide, respectively, within these paths 28a,28b and 29a,29b. As a result of this movement through the paths 28a,28b and 29a,29b, the slider panel assembly 20 opens and closes the window opening 13, which may be facilitated by the use of a handle/latch 36. It should be appreciated that the present invention is not limited by the type of paths that are formed in the tracks or by any pins/guides that are disposed on the sliding panel edges.

The lower track 16 is typically attached to the fixed panels 11,12 and frame 14 by way of an adhesive, such as lower polyurethane beads 44b (see the dark arrows in FIG. 1 that point from the sides of the lower track 16 toward the items 11,12,14,44b that indicate the attachment of the lower track 16 to the fixed panels 11,12 and the frame 14). A similar means may be utilized for attaching the upper track 15 to the items 11,12,14, where the upper polyurethane bead 44a would be used in attaching the upper track 15. It is, however, possible that the tracks 15,16 could be integrally formed as a unitary part with the frame 14.

Due to gravity, interior moisture tends to collect near the lower horizontal frame portion and the lower track 16. Such moisture typically is difficult to remove from the compartment 21. It is, however, a discovery of the present invention that by placing the polyurethane bead 44b below the bottom of the drain holes 48a-c, which are defined in the lower horizontal frame portion, and securing the bottom of a reservoir channel 50, which is defined in the lower track 16 structure, below the bottom of the drain holes 48a-c, that the moisture flows down and into the reservoir channel 50. This structure forms part of the moisture removal system 19.

As a result of this structure, the moisture exits the reservoir channel 50 by flowing through the drain holes 48a-c and down, respectively, vertically oriented channels 45a-c on the exterior surface of the frame 14, which forms an additional part of the moisture removal system 19 (see, for example, FIGS. 3-4a,b where the center drain hole 48b is illustrated but drain holes 48a,c and their respective associated vertically oriented channels 45a,c and 49a,c would be essentially the same). As illustrated in FIGS. 4a,b, a lower appliqué 30a (or fixed panel 11,12) may be disposed on the exterior of the lower horizontal frame portion of the frame 14. As a result, the appliqué 30a would visually hide the drainage of moisture from the compartment 21 of the vehicle in an unencumbered and aesthetically pleasing manner.

Although only two configurations are shown in FIGS. 4a,b, the moisture may flow down vertically oriented channels 45a-c and/or 49a-c in various configurations and still meet the spirit and scope of the present invention. In any of these cases, channels such as items 45a-c and 49a-c would cooperate with their respective drain holes 48a-c to direct the moisture down and away from the reservoir channel 50 to the exterior of the vehicle.

As a further result of this direction of moisture, the lower horizontal exterior portion 30a,11, or 12 prevents the drainage holes 48a,b,c from draining moisture straight through to the exterior of the vehicle, thus further helping to reduce noise from entering the vehicle compartment 21. In addition, the frame 14 may be bonded to the fixed panels 11,12 and appliqués 30,30a, in areas away from the channels 45a-c and 49a-c, hence the frame 14 provides an excellent means for uniformly sealing moisture out of the compartment.

Since the lower track 16 may be bonded to the frame 14 by way of the bead 44b, which is below the reservoir channel 50, the flow of moisture from within the compartment 26 is not blocked as in conventional sliders.

As mentioned above, it is also conceivable that the frame 14 and the tracks (like 16) may be one integral (i.e., unitary) part. However, the reservoir channel 50, the drain holes 48a-c, the frame vertically oriented channels 45a-c, and the appliqué vertically oriented channels 49a-c would essentially cooperate in the manner mentioned above. These features of the present invention are in contrast to conventional sliding assemblies where moisture removal is given only passing attention.

Note that, in general, throughout the subject application and, in particular, with respect to the dimensional differences in the water removal system 19, between the reservoir channel 50, the drain holes 48a-c, the frame vertically oriented channels 45a-c, and the appliqué vertically oriented channels 49a-c, which may only be in fractions of an inch, the patent figures are not intended to be utilized to precisely measure these difference.

It should further be appreciated that the present invention's removal of moisture is achieved with a design using a minimum of parts, those being a fixed panel(s) 11,12 (for example, comprising glass or a plastic material), a lower track 16 (for example, comprising a plastic material), a frame 14 (for example, comprising a plastic material), and possibly a lower appliqué 30a (for example, comprising a polycarbonate compound, an acrylic material, or a painted surface).

Also, it should be appreciated that it is within the spirit and scope of the present invention that the orientation of the structure 10 may be reversed, where the upper track 15 and the lower track 16 would be disposed more toward the right side (as viewed in FIG. 1) of the interior of the assembly 10 and, therefore, the sliding panel assembly 20 would be moved from the right window opening edge (i.e., in the proximity of the right fixed panel 12) toward the center of the horizontal vehicle slider window assembly 10, in order to close the window opening 13.

In accordance with the provisions of the patent statutes, the principles and modes of operation of this invention have been described and illustrated in its preferred embodiments. However, it must be understood that the invention may be practiced otherwise than as specifically explained and illustrated without departing from its spirit or scope.

What is claimed is:

1. A vehicle slider assembly for draining moisture near the interior of the slider assembly to the exterior of a vehicle, comprising:
    a fixed panel having a window opening defined therein, the window opening having an upper opening edge and a lower opening edge that are substantially parallel to each other;
    a frame comprising vertical frame portions, an upper horizontal frame portion, and a lower horizontal frame portion, the frame portions further defining the window opening, wherein each vertical frame portion is attached to the fixed panel and the lower horizontal frame portion has one or more frame drain holes defined therethrough, at the window opening;
    an upper track and a lower track, the lower track being disposed onto the lower horizontal frame portion by way of a selective application of an adhesive, wherein the adhesive is not applied to an area between the lower track and the lower horizontal frame portion where the one or more frame drain holes are disposed, the upper track positioned above and substantially parallel to the upper opening edge and the lower track positioned below and substantially parallel to the lower opening edge, wherein the upper track and the lower track each has at least one guide path defined therein; and
    a slider panel adapted to move between the upper track and the lower track from an open position of the window opening to a closed position of the window opening;
    wherein moisture accumulating on an upper portion of the lower track is drained through the frame drain holes, thereby draining the moisture to the exterior of the vehicle.

2. The vehicle slider assembly of claim 1, wherein the lower track has an upper surface with a reservoir channel defined thereon, the reservoir channel being in fluid communication with the frame drain holes that are in fluid communication with one or more vertically oriented exterior drain channels providing fluid communication between the one or more frame drain holes and a bottom edge of the vehicle slider assembly, thereby moisture accumulating in the reservoir channel near the interior lower horizontal frame portion drains through the frame drain holes to the exterior of the vehicle slider assembly.

3. The vehicle slider assembly of claim 1, wherein the frame drain holes are below and vertically aligned with the window opening.

4. The vehicle slider assembly of claim 1, further comprising a lower appliqué disposed over the lower horizontal frame portion in a plane that is exterior to the lower horizontal frame portion and offset to the plane of the frame and wherein each of the frame drain holes are in fluid communication with a vertically oriented channel disposed on the exterior of the lower horizontal frame portion and/or on the exterior of the lower appliqué to drain moisture to a bottom edge of the vehicle slider assembly, thereby providing drainage of moisture in a hidden, unencumbered, and aesthetically pleasing manner, and reducing noise entering a vehicle compartment.

5. The vehicle slider assembly of claim 1, wherein the fixed panel is disposed over the lower horizontal frame portion in a plane that is exterior to the lower horizontal frame portion and offset from the plane of the frame and wherein each of the frame drain holes are in fluid communication with a vertically oriented channel disposed on the exterior of the lower horizontal frame portion and/or the fixed panel to drain moisture to a bottom edge of the vehicle slider assembly, thereby providing drainage of moisture in a hidden, unencumbered, and aesthetically pleasing manner, and reducing noise from entering a vehicle compartment.

6. The vehicle slider assembly of claim 1, wherein the lower track is disposed on the lower horizontal frame portion by way of an adhesive positioned below the bottom of the frame drain holes.

7. The vehicle slider assembly of claim 6, wherein the adhesive comprises a polyurethane bead.

8. The vehicle slider assembly of claim 1, wherein the frame and the lower track are a unitary part.

9. The vehicle slider assembly of claim 1, wherein the frame and the upper track are a unitary part.

10. The vehicle slider assembly of claim 1, wherein the fixed panel comprises glass or a plastic material.

11. The vehicle slider assembly of claim 1, wherein the frame and the upper and lower tracks comprise a plastic material.

12. The vehicle slider assembly of claim 1, wherein the lower appliqué comprises a polycarbonate compound, an acrylic material, or a painted surface.

13. The vehicle slider assembly of claim 1, wherein the frame has an interior surface that is adapted to provide continuous sealing between the interior frame surface and seals disposed on an outwardly directed surface of the slider panel.

14. The vehicle slider assembly of claim 13, wherein the seals have articulating portions that fold one onto the other.

15. The vehicle slider assembly of claim 1, wherein the frame is secured to the fixed panels by way of another adhesive that is disposed therebetween.

16. The vehicle slider assembly of claim 1, wherein the frame is secured to the fixed panels by way of an encapsulating seal.

* * * * *